United States Patent
Roake et al.

(10) Patent No.: US 11,636,224 B2
(45) Date of Patent: Apr. 25, 2023

(54) GENERATING HASH VALUES FOR INPUT STRINGS

(71) Applicant: MICRO FOCUS LLC, Santa Clara, CA (US)

(72) Inventors: Timothy Roake, Santa Clara, CA (US); Luther Martin, Santa Clara, CA (US)

(73) Assignee: MICRO FOCUS LLC, Sanford, NC (US)

( * ) Notice: Subject to any disclaimer, the term of this patent is extended or adjusted under 35 U.S.C. 154(b) by 641 days.

(21) Appl. No.: 16/720,241

(22) Filed: Dec. 19, 2019

(65) Prior Publication Data

US 2021/0192072 A1    Jun. 24, 2021

(51) Int. Cl.
*G06F 21/62*    (2013.01)
*G06F 21/60*    (2013.01)
*H04L 9/06*    (2006.01)

(52) U.S. Cl.
CPC ........ *G06F 21/6245* (2013.01); *G06F 21/602* (2013.01); *H04L 9/0643* (2013.01); *G06F 2221/2107* (2013.01)

(58) Field of Classification Search
CPC ............... G06F 21/602; G06F 21/6245; G06F 2221/2107; H04L 9/0643
See application file for complete search history.

(56) References Cited

U.S. PATENT DOCUMENTS

| | | | | |
|---|---|---|---|---|
| 5,032,987 A * | 7/1991 | Broder | ............... | H04L 69/00 |
| | | | | 711/221 |
| 6,434,662 B1 * | 8/2002 | Greene | ............... | G06F 16/9014 |
| | | | | 711/216 |
| 8,325,721 B2 * | 12/2012 | Gong | ............... | H04L 45/54 |
| | | | | 370/389 |
| 8,649,509 B2 * | 2/2014 | Asher | ............... | H04L 9/0643 |
| | | | | 713/180 |
| 8,769,637 B2 | 7/2014 | Janzen | | |
| 8,812,570 B2 * | 8/2014 | Schneider | ............. | H04L 9/0643 |
| | | | | 708/250 |
| 9,270,592 B1 | 2/2016 | Sites | | |
| 9,292,560 B2 | 3/2016 | Attaluri et al. | | |
| 9,560,059 B1 * | 1/2017 | Islam | ............... | G06F 21/566 |
| 2008/0065713 A1 * | 3/2008 | Lee | ............... | G06F 7/728 |
| | | | | 708/491 |
| 2016/0202984 A1 * | 7/2016 | Greiner | ............... | G06F 9/3001 |
| | | | | 712/226 |

(Continued)

FOREIGN PATENT DOCUMENTS

CN    102880628    2/2015
WO   WO2019171129   9/2019

OTHER PUBLICATIONS

NPL Search Terms (Year: 2022).*

(Continued)

*Primary Examiner* — Syed A Zaidi

(57) ABSTRACT

A computing device includes a processor and a machine-readable storage storing instructions. The instructions are executable by the processor to: receive an input string including sensitive data to be encrypted; identify a first portion and a second portion of the input string, the first portion comprising the sensitive data; select, from a plurality of hash functions, a hash function based on the second portion; and generate a hash value of the first portion using the selected hash function.

20 Claims, 8 Drawing Sheets

(56) References Cited

U.S. PATENT DOCUMENTS

2018/0336263 A1 11/2018 Bensberg et al.
2019/0190695 A1* 6/2019 Kaul .................. G06F 21/6227
2019/0305929 A1* 10/2019 Onoda ................. H04L 9/0637

OTHER PUBLICATIONS

NPL Search Terms (Year: 2023).*
Ilan Komargodski, et al., "On Distributional Collision Resistant Hashing," 2018, 14 pages total.

* cited by examiner

| Domain Value 610 | Counter 620 |
|---|---|
| S1 | 1 |
| S2 | 1 |
| S3 | 4 |
| S4 | 1 |
| S6 | 2 |
| --- | --- |

600

| Hash Value 635 |
|---|
| H1 |
| H2 |
| H3 |
| H4 |
| H5 |
| --- |

GENERATING HASH VALUES FOR INPUT STRINGS

BACKGROUND

A business organization (e.g., a retail business, a professional corporation, a financial institution, and so forth) may collect, process and/or store data that represents sensitive or confidential information about individuals or business organizations. For example, the data may be personal data that may represent names, residence addresses, medical histories, salaries, banking information, and so forth. The data may be initially collected or acquired in "plaintext form," and as such may be referred to as "plaintext data." Plaintext data refers to ordinarily readable data (e.g., text, numbers, and so forth).

BRIEF DESCRIPTION OF THE DRAWINGS

Some implementations are described with respect to the following figures.

FIG. 6 is a schematic diagram of an example mapping table, in accordance with some implementations.

DETAILED DESCRIPTION

In order to protect sensitive or confidential data from improper access, some systems may store the data in an encrypted form. For example, a company may store business records in a database, and may encrypt data that includes sensitive or confidential information (e.g., social security numbers, bank account identifiers, health data, and so forth). In some examples, an encryption system using a hashing function to generate a hash value from a given plaintext input string. However, using a hashing function may result in a "hash collision," in which multiple input values generate the same hash value. Therefore, additional processing may be required to handle or resolve hash collisions. Accordingly, system performance and efficiency may be negatively impacted by hash collisions.

As described further below with reference to FIGS. 2-4, some implementations may provide improved techniques for reducing or eliminating hash collisions in encryption systems. In some implementations, two or more portions are extracted from an input string, where a first portion is sensitive data to be encrypted, and a second portion is non-sensitive data. The second portion may be used to select one of multiple hash functions, and the selected hash function may be applied to the first portion. For example, the different hash functions may use different hashing algorithms, and/or may generate output hash values of different lengths. Accordingly, the hash value of the first portion may be diversified by different hash functions, which may reduce or eliminate hash collisions.

Further, as described further below with reference to FIGS. 5-8, some implementations may include performing an initial set-up process (e.g., prior to receiving input strings to be encrypted) to generate the hash values corresponding to all possible combinations of input characters. If a given input string results in a hash collision (i.e., the hash output has been previously generated) during the set-up process, the hash output may be re-processed as the input for another iteration of the hash function to generate new hash output. Such re-processing may be repeated until the result a unique hash (i.e., with no hash collision). The number of iterations that are needed to obtain a unique hash value for each input string is tracked. When this set-up process is completed, a mapping table is generated that stores each input string and its associated number of iterations required to obtain a unique hash value. Subsequently, when an input string is received to be encrypted, the mapping table may be accessed to determine the associated number of iterations. Accordingly, the hashing function may be applied for the indicated number of iterations to generate a hash output. In this manner, hash collisions may be reduced or eliminated.

System Overview

Figure 1:
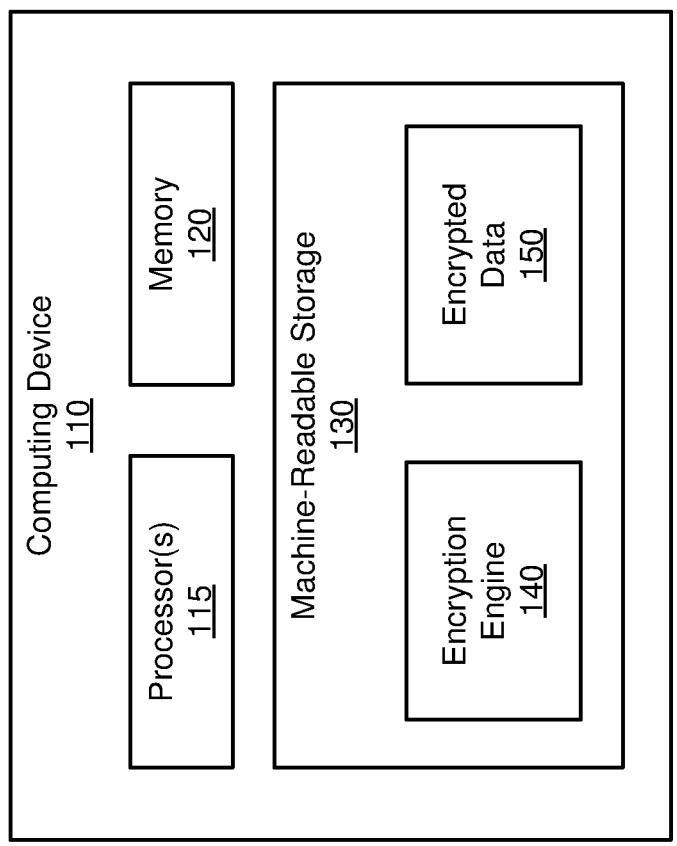
FIG. 1 is a schematic diagram of an example system, in accordance with some implementations.

FIG. 1 shows a schematic diagram of an example computing device 110, in accordance with some implementations. The computing device 110 may be, for example, a computer, a portable device, a server, a network device, an appliance, a communication device, etc. In other examples, the computing device 110 may be a server rack system including multiple computing modules (e.g., blade servers), networking devices, storage devices, power supply components, and so forth. Further, in yet other examples, the computing device 110 may be a computing cluster, a datacenter, a distributed system, and so forth.

In some implementations, the computing device 110 may include processor(s) 115, memory 120, and machine-readable storage 130. The processor(s) 115 can include a microprocessor, a microcontroller, a processor module or subsystem, a programmable integrated circuit, a programmable gate array, multiple processors, a microprocessor including multiple processing cores, or another control or computing device. The memory 120 can be any type of computer memory (e.g., dynamic random access memory (DRAM), static random-access memory (SRAM), etc.).

In some implementations, the machine-readable storage 130 can include non-transitory storage media such as hard drives, flash storage, optical disks, etc. As shown, the machine-readable storage 130 may store an encryption engine 140 and encrypted data 150. In some examples, the encryption engine 140 may be implemented in executable instructions stored in the machine-readable storage 130 (e.g., software and/or firmware). However, the encryption engine 140 may be implemented in any suitable manner. For example, some or all of the encryption engine 140 could be hard-coded as circuitry included in the processor(s) 115 and/or the computing device 110. In other examples, some or all of the encryption engine 140 could be implemented on a remote computer (not shown), as web services, and so forth. In another example, the encryption engine 140 may be implemented in one or more controllers of the computing device 110.

In one or more implementations, the encryption engine 140 may receive input data to be encrypted. For example, the input data may include sensitive or confidential information about individuals or business organizations (e.g., names, residence addresses, medical histories, salaries, banking information, etc.). In some implementations, the encryption engine 140 may apply one or more hashing functions to the input data, thereby generating a hash output that is encrypted. The hash outputs may be stored in the encrypted data 150. In some implementations, the encryption engine 140 may use one or more format preserving hashing (FPH) functions to produce encrypted outputs that preserve or maintain the format of the input data. In this manner, the encrypted data 150 may be stored in the same data structure format(s) as the corresponding input data values.

Selecting Hash Function Based on Portion of Input String

In some implementations, the encryption engine 140 may use at least one portion of an input string to select a particular hash function from a set of multiple hash functions. Referring now to FIG. 2, shown is an example operation 200 in accordance with some implementations. As shown, the example operation 200 may involve an input string 210 that includes sixteen numeric digits (e.g., a credit card number, a bank account number, and so forth). Further, in the example of FIG. 2, a first portion 212 includes sensitive data to be encrypted, while a second portion 214 and a third portion 216 include data that will not be encrypted.

Figure 2:
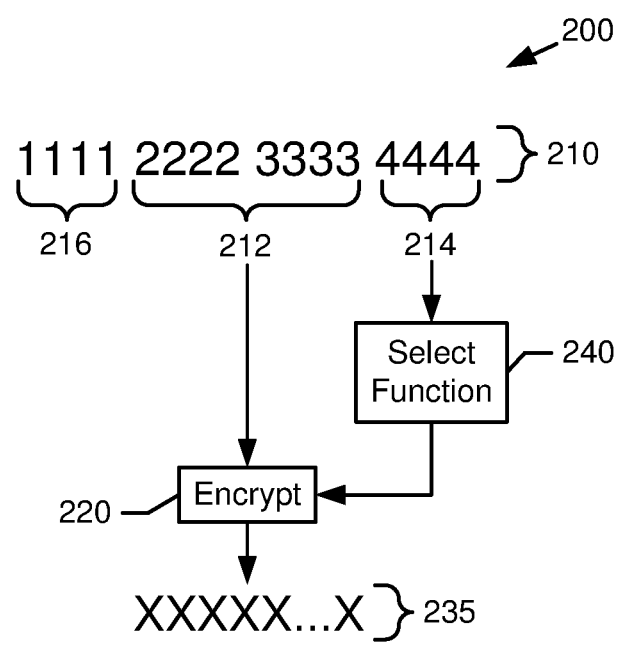
FIG. 2 is an illustration of an example operation, in accordance with some implementations.

As shown in FIG. 2, in some implementations, the portion(s) not including sensitive data (e.g., the second portion 214 and/or the third portion 216) may be used to select one of multiple hash functions (box 240). The selected hash function may be used to encrypt (box 220) the first portion 212, thereby generating the hash output 235. For example, assume that the second portion 214 includes four decimal digits that could define any number between "0000" and "9999." Accordingly, in this example, the hash function may be selected based on matching the numerical value of the second portion 214 to predefined ranges associated with different hash functions. For example, a first hash function may be selected if the numerical value of the second portion 214 is between "0000" and "0999," a second hash function may be selected if the numerical value of the second portion 214 is between "1000" and "1999," and a third hash function may be selected if the numerical value of the second portion 214 is between "2000" and "9999."

In another example, assume that the third portion 216 includes four alphabetic letters that represent a portion of a person's name. Accordingly, in this example, the hash function may be selected based on matching the first letter of the third portion 216 to predefined ranges associated with different hash functions. For example, a first hash function may be selected if the first letter of the third portion 216 is between "A" and "E," a second hash function may be selected if the first letter of the third portion 216 is between "F" and "J," and a third hash function may be selected if the first letter of the third portion 216 is between "K" and "Z."

In some implementations, the selection of the hash function (box 240) may be based on a combination of two or more different text portions. For example, assume that the second portion 214 and the third portion 216 each include four numerical digits that could define any number between "0000" and "9999." Accordingly, in this example, the hash function may be selected based on combinations of values of the second portion 214 and the third portion 216. For example, a first hash function may be selected if the second portion 214 is less than "1000" and the third portion 216 is greater than "9000," a second hash function may be selected if the second portion 214 is greater than "9000" and the third portion 216 is less than "1000," and a third hash function may be selected in all other cases.

In some implementations, the hash function may be selected (box 240) from a predefined set of multiple hash functions. In some implementations, the predefined set of multiple hash functions may be format preserving hashing (FPH) functions. For example, each hash function may generate a hash output with character format(s) that matches the character format(s) of the input string (e.g., text, number, and so forth). In some implementations, the hash functions in the predefined set may use different hashing algorithms that provide diversified hash results. Further, in some implementations, the hash functions in the predefined set may generate hash outputs of different lengths. For example, a first hash function may generate a hash output of 12 characters, a second hash function may generate a hash output of 18 characters, a third hash function may generate a hash output of 21 characters, and so forth. In this manner, the use of multiple hash functions may provide different hash outputs, and thereby may reduce or eliminate hash collisions.

Figure 3:
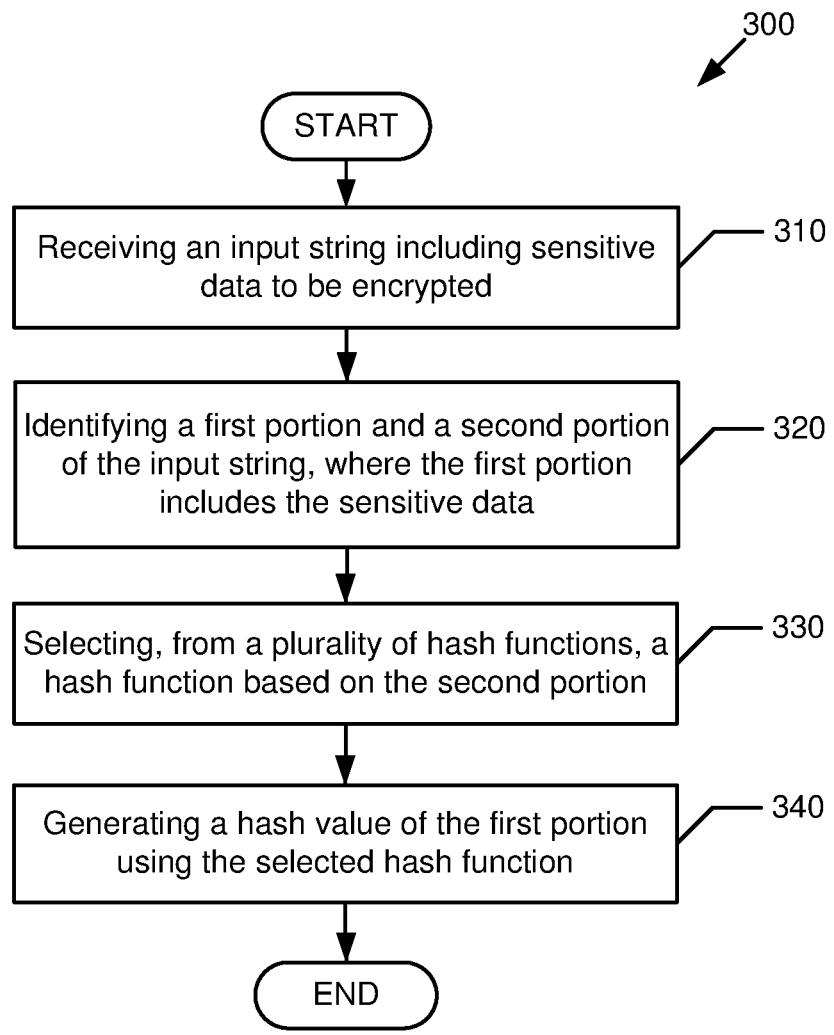
FIG. 3 is a flow diagram of an example process for generating a hash value, in accordance with some implementations.

Referring now to FIG. 3, shown is an example process 300 for generating a hash value, in accordance with some implementations. In some examples, the process 300 may be performed by some or all of the encryption engine 140 shown in FIG. 1. The process 300 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1 and 2, which show examples in accordance with some implementations. However, other implementations are also possible.

Block 310 may include receiving an input string including sensitive data to be encrypted. For example, referring to FIGS. 1-2, the encryption engine 140 may receive the input string 200.

Block 320 may include identifying a first portion and a second portion of the input string, where the first portion includes the sensitive data. For example, referring to FIGS. 1-2, the encryption engine 140 may identify the first portion 212 that includes sensitive data to be encrypted, and may identify the portions 214, 216 including data that is not to be encrypted.

Block 330 may include selecting, from a plurality of hash functions, a hash function based on the second portion. For example, referring to FIGS. 1-2, the encryption engine 140 may select a hash function (box 240) based on characteristics of the second portion 214 and/or the third portion 216 (e.g., numeric ranges, alphabetic ranges, combinations of multiple characters, and so forth). In some examples, the different hash functions may use different hashing algorithms, and/or may generate output hash values of different lengths. The multiple hash functions may be predefined for use by the encryption engine 140 (e.g., prior to receipt of the input string at block 310).

Block 340 may include generating a hash value of the first portion using the selected hash function. For example, referring to FIGS. 1-2, the encryption engine 140 may encrypt (box 220) the first portion 212 using the hash function selected based on characteristics of the second portion 214 and/or the third portion 216, thereby generating the hash output 235. After block 340, the process 300 may be completed. Note that process 300 is provided as an example, and other implementations are possible.

Figure 4:
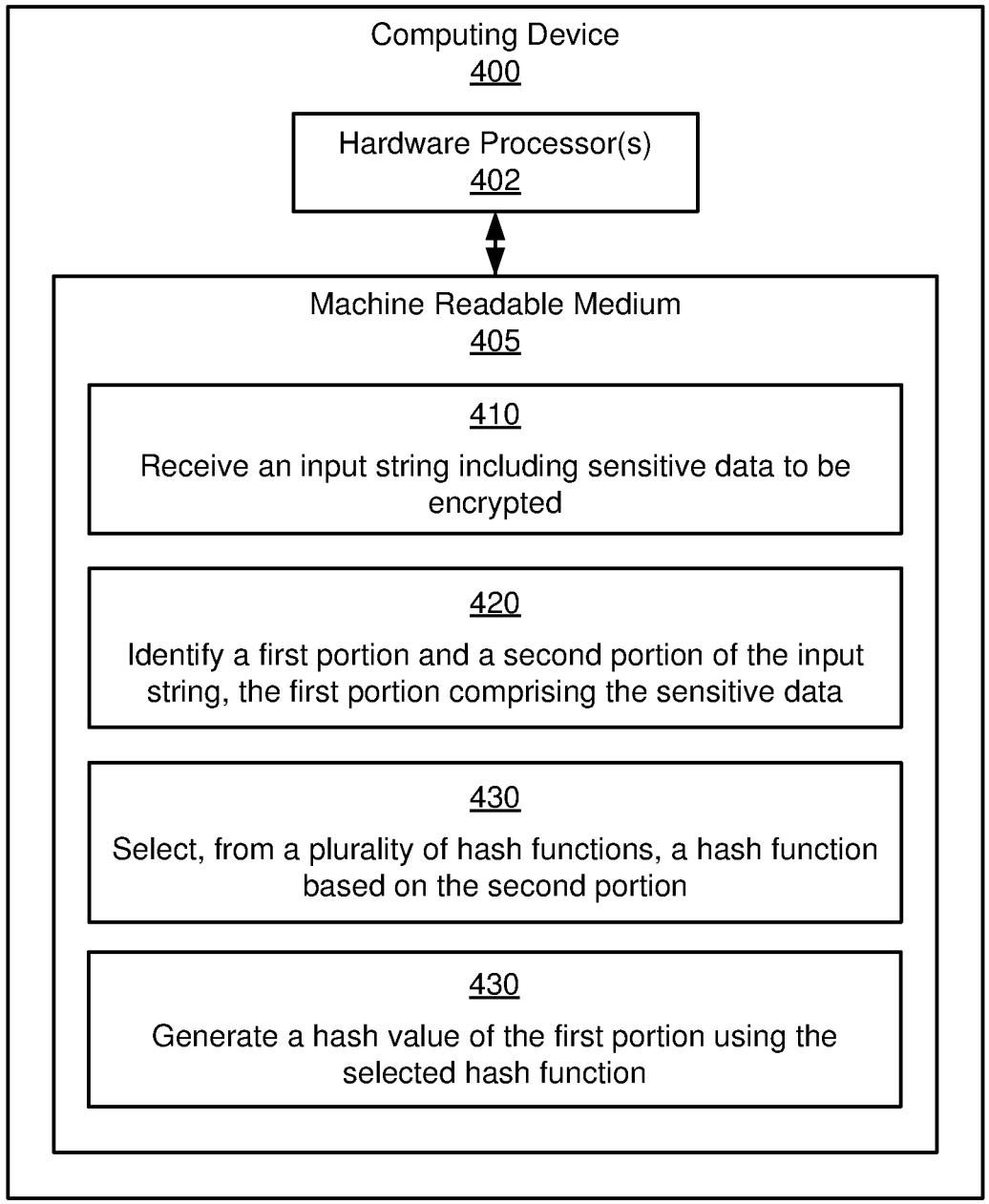
FIG. 4 is a schematic diagram of an example computing device, in accordance with some implementations.

Referring now to FIG. 4, shown is a schematic diagram of an example computing device 400. In some examples, the computing device 400 may correspond generally to the computing device 110 shown in FIG. 1. As shown, the computing device 400 may include hardware processor(s) 402 and machine-readable storage medium 405. The machine-readable storage medium 405 may be a non-transitory medium, and may store instructions 410-440. The instructions 410-440 can be executed by the hardware processor(s) 402. In some implementations, the storage medium 405 including instructions 410-440 may be separate from (or external to) the computing device 400.

Instruction 410 may be executed to receive an input string including sensitive data to be encrypted. For example, referring to FIGS. 1-2, the encryption engine 140 may receive the input string 200.

Instruction 420 may be executed to identify a first portion and a second portion of the input string, the first portion comprising the sensitive data. For example, referring to FIGS. 1-2, the encryption engine 140 may identify the portion 214 that includes sensitive data to be encrypted, and may identify the portions 214, 216 including data that is not to be encrypted.

Instruction 430 may be executed to select, from a plurality of hash functions, a hash function based on the second portion. For example, referring to FIGS. 1-2, the encryption engine 140 may select a hash function (box 240) based on characteristics of the second portion 214 and/or the third portion 216 (e.g., numeric ranges, alphabetic ranges, combinations of multiple characters, and so forth).

Instruction 440 may be executed to generate a hash value of the first portion using the selected hash function. For example, referring to FIGS. 1-2, the encryption engine 140 may encrypt (box 220) the first portion 212 using the hash function selected based on characteristics of the second portion 214 and/or the third portion 216, thereby generating the hash output 235.

As described above with reference to FIGS. 2-4, some implementations may provide improved techniques for reducing or eliminating hash collisions in encryption systems. In some examples, an input string may include a first portion and a second portion. The second portion may be used to select one of multiple hash functions. The selected hash function may be used to encrypt the first portion. In this manner, the outputs of hashing the first portion may be diversified, thereby reducing or eliminating hash collisions. Accordingly, the performance and/or efficiency of an encryption computer system may be improved.

Note that, while various example implementations are described above with reference to FIGS. 2-4, implementations are not limited by these examples. For example, the input string 210 may include any number of characters and/or any number of distinct portions. Further, the predefined set of hash functions may include any number of hash functions. Furthermore, the selection of hash function may include any number and/or combination of portions and/or characters of the input string 210.

Performing Hashing Iterations Based on Mapping Table

Referring again to FIG. 1, in some implementations, the encryption engine 140 may use a mapping table to perform one or more iterations of a hash function. In some implementations, the mapping table may be generated during a set-up process that includes generating hash values corresponding to all possible combinations of input characters.

Figure 5:
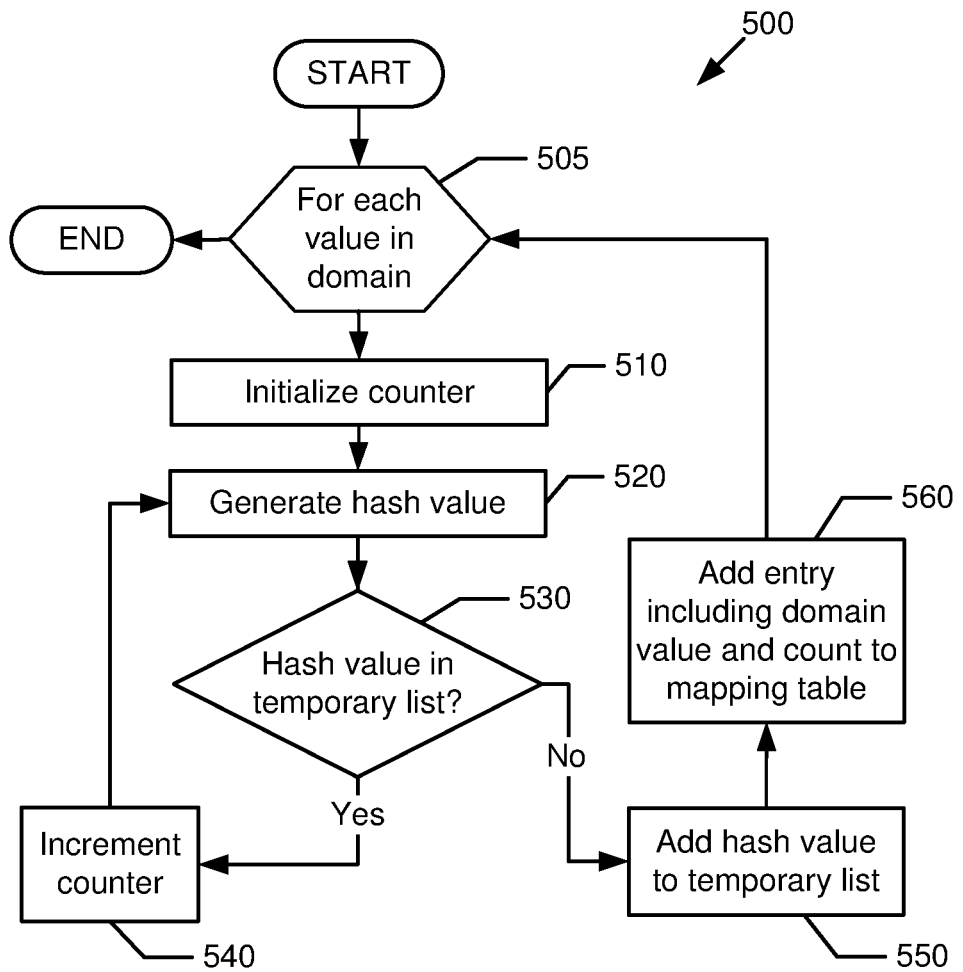
FIG. 5 is a flow diagram of an example process for generating a mapping table, in accordance with some implementations.

Referring now to FIG. 5, shown is an example process 500 for generating a mapping table, in accordance with some implementations. In some examples, the process 500 may be performed by some or all of the encryption engine 140 shown in FIG. 1. The process 500 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 500 may be described below with reference to FIG. 6, which shows examples data structures 600, 630 in accordance with some implementations. However, other implementations are also possible.

Block 505 may enter a loop (including blocks 510, 520, and so forth) to process each value in a domain. As used herein, the term "domain" refers to all possible input values for a given data type or use. For example, referring to FIGS. 1-2, the encryption engine 140 may perform a set-up process to generate a mapping table for later use in hashing the second portion 214 of the input string 200. The encryption engine 140 may determine that the second portion 214 includes eights decimal digits, and thus has a domain including each number between "00000000" to "99999999." Accordingly, the encryption engine 140 may iterate through each number in the range as the possible input values for this domain (also referred to herein as "domain values").

Block 510 may include initializing an iteration counter. Block 520 may include generating a hash value for the current domain value. For example, referring to FIGS. 1-2, the encryption engine 140 initialize a counter (e.g., set to "1") associated with the current domain value, and may apply a hash function to the current domain value to generate a hash output. In some implementations, the hash value generated at block 520 may have the same number of characters as the domain value that is processed by a hashing function. In some examples, block 520 may include applying a format preserving hashing (FPH) function to the domain value. In some examples, each instance of generating a hash value at block 520 is performed using the same FPH function.

Diamond 530 may include determining whether the current hash value (generated at block 520) is included in a temporary list of hash values that were previously generated by the process 500. If it is determined at diamond 530 that the current hash value is not included in the temporary list, then at block 550, the hash value may be added to the temporary list. For example, referring to FIGS. 1, 2, and 6, the encryption engine 140 may determine whether the current hash value is a duplicate of any hash value that was previously generated during the set-up process (i.e., results in a hash collision). In some examples, the encryption engine 140 may store each hash value 635 that is generated in a temporary list 630. Further, the encryption engine 140 may check whether the current hash value is already present in the temporary list 630, and if it is not already present, may add the current hash value to the temporary list 630. In some examples, the temporary list 630 that may be discarded or deleted after completing the set-up process.

Block 560 may include adding a new entry including the domain value and an iteration count to a mapping table. For example, referring to FIGS. 1, 2 and 6, the encryption engine 140 may add a new entry to the mapping table 600. The new entry may include a domain value field 610 and a counter field 620. The domain value field 610 stores the domain value that is being processed at the time of adding the new entry. The counter field 620 may store the current value of the counter associated with the domain value (also referred to herein as "iteration count"). Note that in this example, if a hash of the domain value does not result in a hash collision, the iteration count has a value of "1." For example, as shown in FIG. 6, the mapping table 600 stores an entry including the domain value "S1" and the counter value "1," indicating that a single hashing iteration was needed to generate a unique hash value for the domain value "S1" (i.e., with no hash collision). After block 560, the process 500 may return to block 505 (i.e., to process the next value in the domain).

However, if it is determined at diamond 530 that the current hash value is already included in the temporary list, then at block 540, the iteration counter may be incremented by one. After block 540, the process 500 may return to block 520, where the current hash value is re-processed as the input for another iteration of the hash function to generate new hash output. Next, at diamond 530, it may be determined whether the new hash output is included in the temporary list. In this manner, multiple hashing iterations (including blocks 520, 530, and 540) may be performed until the result is a hash value that has not been previously generated (i.e., with no hash collision). Once it is determined the result is a hash value that has not been previously generated (at diamond 530), the process 500 continues at blocks 550 and 560 (i.e., adding the hash value to the temporary list, and adding a new entry to the mapping table).

For example, referring to FIGS. 1, 2, and 6, if the current hash value is already included in the temporary list, the encryption engine 140 may increment the iteration counter by one, and may apply the hash function to the current hash value to generate a new hash value. The encryption engine 140 may perform a number of hashing iterations until a hash value is generated that is not included in the temporary list 630, and then may add the hash value to the temporary list 630. Further, the encryption engine 140 may add a new entry to the mapping table that includes the current domain value and the associated iteration counter. For example, as shown in FIG. 6, the mapping table 600 stores an entry including domain value "S3" and counter value "4," indicating that four hashing iterations were needed to generate a unique hash value for the domain value "S3" (i.e., with no hash collision).

Referring again to FIG. 5, the process 500 may return to block 505 to process the next domain value (e.g., the next number in the range of possible input values). Once all domain values are processed, the process 500 may be completed. Note that process 500 is provided as an example, and other implementations are possible.

In some implementations, the number of hashing iterations that are performed for a particular domain value may be limited to a maximum number (e.g., ten iterations). For example, if the maximum number of hashing iterations has been reached without generating a unique hash value, then the process 500 may be terminated for the particular domain value. In this event, in some implementations, the mapping table 600 may not include any entry for that particular domain value. Alternatively, in some implementations, an entry may be added to the mapping table 600 that specifies a given counter value 620 (e.g., one). Accordingly, a hash collision associated with the particular domain value may be tolerated in the event that the maximum number of hashing iterations has been reached. In some examples, the maximum number of hashing iterations may be specified by a configuration setting of the encryption engine 140.

Figure 7:
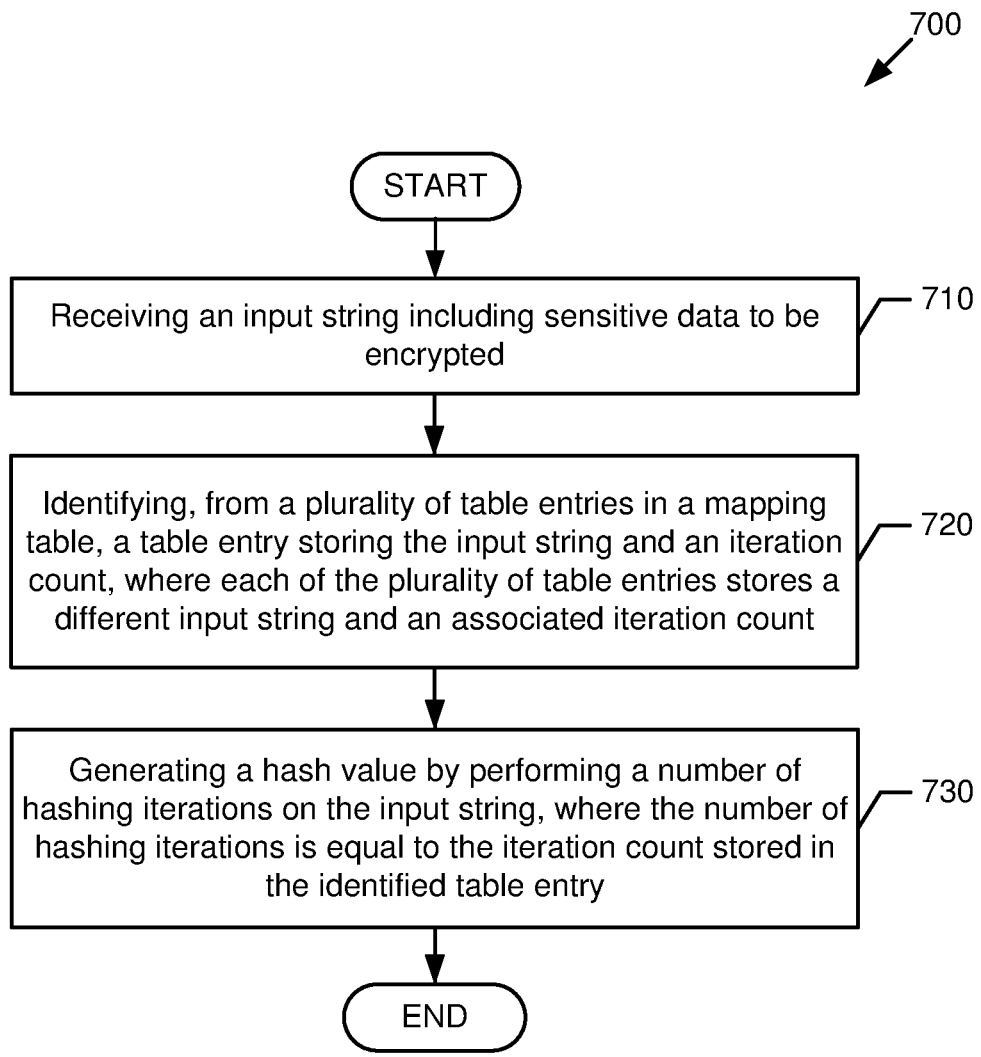
FIG. 7 is a flow diagram of an example process for generating a hash value, in accordance with some implementations.

Referring now to FIG. 7, shown is an example process 700 for generating a hash value, in accordance with some implementations. In some examples, the process 700 may be performed by some or all of the encryption engine 140 shown in FIG. 1. The process 700 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 700 may be described below with reference to FIGS. 1-6, which show examples in accordance with some implementations. However, other implementations are also possible.

Block 710 may include receiving an input string including sensitive data to be encrypted. For example, referring to FIGS. 1-2, the encryption engine 140 may receive the input string 200 for encryption.

Block 720 may include identifying, from a plurality of table entries in a mapping table, a table entry storing the input string and an iteration count, where each of the plurality of table entries stores a different input string and an associated iteration count. For example, referring to FIGS. 1-6, the encryption engine 140 may match the input string 200 to the "S3" domain value stored in an entry of the mapping table 600.

Block 730 may include generating a hash value by performing a number of hashing iterations on the input string, where the number of hashing iterations is equal to the iteration count stored in the identified table entry. For example, referring to FIGS. 1-6, the encryption engine 140 may determine that the matching "S3" entry of the mapping table 600 includes the string count of "4." As discussed above with reference to FIGS. 5-6, the counter value 620 stored in the mapping table 600 may indicate the number of hashing iterations that were previously determined (e.g., during a set-up process) to be required to generate a hash value without a hash collision. Accordingly, based on the counter value 620 of "4" in the matching entry, the encryption engine 140 may perform four hashing iterations to generate a hash value without a hash collision. In this example, the first iteration may apply the hash function to the input string, the second iteration may apply the hash function to the output of the first iteration, the third iteration may apply the hash function to the output of the second iteration, and the fourth iteration may apply the hash function to the output of the third iteration. In some implementations, the hash value generated at block 730 may have the same number of characters as the input string that is processed by a hashing function. In some examples, block 730 may include applying a format preserving hashing (FPH) function to the input string. After block 730, the process 700 is completed. Note that the process 700 may be repeated for each input string that is received for encryption.

Figure 8:
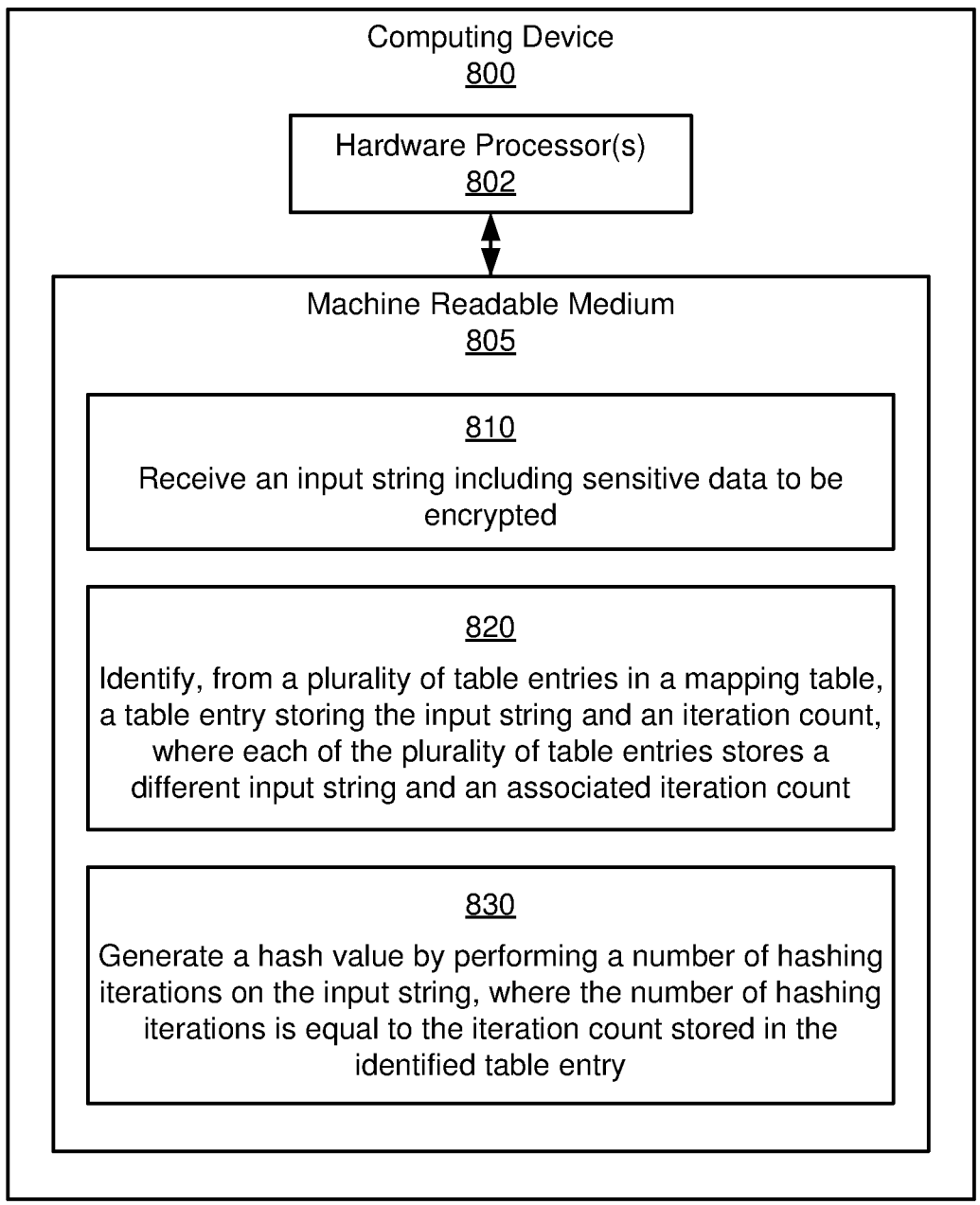
FIG. 8 is a schematic diagram of an example computing device, in accordance with some implementations.

Referring now to FIG. 8, shown is a schematic diagram of an example computing device 800. In some examples, the computing device 800 may correspond generally to the computing device 110 shown in FIG. 1. As shown, the computing device 800 may include hardware processor(s) 802 and machine-readable storage medium 805. The machine-readable storage medium 805 may be a non-transitory medium, and may store instructions 810-830. The instructions 810-830 can be executed by the hardware processor(s) 802. In some implementations, the storage medium 805 including instructions 810-830 may be separate from (or external to) the computing device 800.

Instruction 810 may be executed to receive an input string including sensitive data to be encrypted. For example, referring to FIGS. 1-2, the encryption engine 140 may receive the input string 200 for encryption.

Instruction 820 may be executed to identify, from a plurality of table entries in a mapping table, a table entry storing the input string and an iteration count, where each of the plurality of table entries stores a different input string and an associated iteration count. For example, referring to FIGS. 1-6, the encryption engine 140 may match the input string 200 to the domain value "S3" stored in an entry of the mapping table 600.

Instruction 820 may be executed to generate a hash value by performing a number of hashing iterations on the input string, where the number of hashing iterations is equal to the iteration count stored in the identified table entry. For example, referring to FIGS. 1-6, the encryption engine 140 may determine that the matching "S3" entry of the mapping table 600 includes the string count of "4." Accordingly, the encryption engine 140 may perform four hashing iterations to generate a hash value without a hash collision.

As described above with reference to FIGS. 5-8, some implementations may provide improved techniques for reducing or eliminating hash collisions in encryption systems. In some examples, a mapping table may be generated during a set-up process. Subsequently, when an input string is received to be encrypted, the mapping table may be accessed to determine the number of hashing iterations that are needed to generate a unique hash output. In this manner, hash collisions may be reduced or eliminated.

Note that, while various example implementations are described above with reference to FIGS. 5-8, implementations are not limited by these examples. For example, while the mapping table 600 and the temporary list 630 are shown in FIG. 6 as having particular fields, it is contemplated that this data may be stored in any suitable manner (e.g., in different data structures, with different fields, with additional fields, and so forth, in a single data structure, and so forth). In another example, while the counter is described above as being initially set to "1" when the input string is hashed, it is contemplated that the counter may instead be set to "0" when the input string is hashed. In such examples, if the hash of the input string does not result in a hash collision, the counter field 620 in the corresponding entry will store the value of "0."

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above.

What is claimed is:

1. A computing device comprising:
   a hardware processor; and
   a machine-readable storage storing instructions executable by the processor to:
   receive an input string including sensitive data to be encrypted;
   identify a first portion and a second portion of the input string, the first portion comprising the sensitive data;
   select, from a plurality of hash functions, a hash function based on the second portion of the input string; and
   generate a hash value of the first portion of the input string using the selected hash function, wherein generating the hash value of the first portion using the hash function that was selected based on the second portion enhances security of the sensitive data.

2. The computing device of claim 1, wherein the plurality of hash functions are predefined for use by an encryption engine.

3. The computing device of claim 1, wherein the plurality of hash functions generate hash outputs having different numbers of characters.

4. The computing device of claim 1, wherein the plurality of hash functions comprise format preserving hashing (FPH) functions.

5. The computing device of claim 1, wherein the second portion comprises a numerical value, and wherein the instructions are executable by the processor to:
   determine that the numerical value of the second portion is included within a first numerical range of a plurality of numerical ranges, wherein each of the plurality of numerical ranges is associated with a different hash function of the plurality of hash functions; and
   in response to a determination that the numerical value of the second portion falls within the first numerical range, identify a first hash function associated with the first numerical range, wherein the selected hash function is the first hash function.

6. The computing device of claim 1, wherein the second portion comprises a plurality of alphabetic letters, and wherein the instructions are executable by the processor to:
   determine that a first letter of the second portion falls within a first alphabetic range of a plurality of alphabetic ranges, wherein each of the plurality of alphabetic ranges is associated with a different hash function of the plurality of hash functions; and
   in response to a determination that the first letter of the second portion falls within the first alphabetic range, identify a first hash function associated with the first alphabetic range, wherein the selected hash function is the first hash function.

7. The computing device of claim 1, wherein the input string comprises a third portion that is distinct from the first and second portions, and wherein the instructions are executable by the processor to:
   select the hash function based on both the second portion and the third portion.

8. A computer implemented method comprising:
   receiving, by an encryption engine, an input string including sensitive data to be encrypted;

identifying, by the encryption engine, a first portion and a second portion of the input string, the first portion comprising the sensitive data;

selecting by the encryption engine, from a plurality of hash functions, a hash function based on the second portion of the input string; and generating, by the encryption engine, a hash value of the first portion of the input string using the selected hash function, wherein generating the hash value of the first portion using the hash function that was selected based on the second portion enhances security of the sensitive data.

9. The computer implemented method of claim 8, wherein the plurality of hash functions generate hash outputs having different numbers of characters.

10. The computer implemented method of claim 8, wherein the plurality of hash functions comprise format preserving hashing (FPH) functions.

11. The computer implemented method of claim 8, wherein the second portion comprises a numerical value, and the method comprising:

determining that the numerical value of the second portion is included within a first numerical range of a plurality of numerical ranges, wherein each of the plurality of numerical ranges is associated with a different hash function of the plurality of hash functions; and in response to a determination that the numerical value of the second portion falls within the first numerical range, identifying a first hash function associated with the first numerical range, wherein the selected hash function is the first hash function.

12. The computer implemented method of claim 8, wherein the second portion comprises a set of alphabetic letters, and the method comprising:

determining that a first letter of the second portion falls within a first alphabetic range of a plurality of alphabetic ranges, wherein each of the plurality of alphabetic ranges is associated with a different hash function of the plurality of hash functions; and in response to a determination that the first letter of the second portion falls within the first alphabetic range, identifying a first hash function associated with the first alphabetic range, wherein the selected hash function is the first hash function.

13. The computer implemented method of claim 8, wherein the input string comprises a third portion that is distinct from the first and second portions, and the method comprising:

selecting the hash function based on both the second portion and the third portion.

14. A non-transitory computer-readable storage medium storing instructions that when executed cause a processor to:

receive an input string including sensitive data to be encrypted;

identify a first portion and a second portion of the input string, the first portion comprising the sensitive data;

select, from a plurality of hash functions, a hash function based on the second portion of the input string; and generate a hash value of the first portion of the input string using the selected hash function, wherein generating the hash value of the first portion using the hash function that was selected based on the second portion enhances security of the sensitive data.

15. The non-transitory computer-readable storage medium of claim 14, wherein the plurality of hash functions are predefined for use by an encryption engine.

16. The non-transitory computer-readable storage medium of claim 14, wherein the plurality of hash functions generate hash outputs having different numbers of characters.

17. The non-transitory computer-readable storage medium of claim 14, wherein the plurality of hash functions comprise format preserving hashing (FPH) functions.

18. The non-transitory computer-readable storage medium of claim 14, wherein the second portion comprises a numerical value, and wherein the instructions further cause the processor to:

determine that the numerical value of the second portion is included within a first numerical range of a plurality of numerical ranges, wherein each of the plurality of numerical ranges is associated with a different hash function of the plurality of hash functions; and in response to a determination that the numerical value of the second portion falls within the first numerical range, identify a first hash function associated with the first numerical range, wherein the selected hash function is the first hash function.

19. The non-transitory computer-readable storage medium of claim 14, wherein the second portion comprises a plurality of alphabetic letters, and wherein the instructions further cause the processor to:

determine that a first letter of the second portion falls within a first alphabetic range of a plurality of alphabetic ranges, wherein each of the plurality of alphabetic ranges is associated with a different hash function of the plurality of hash functions; and in response to a determination that the first letter of the second portion falls within the first alphabetic range, identify a first hash function associated with the first alphabetic range, wherein the selected hash function is the first hash function.

20. The non-transitory computer-readable storage medium of claim 14, wherein the input string comprises a third portion that is distinct from the first and second portions, and wherein the instructions further cause the processor to:

select the hash function based on both the second portion and the third portion.

* * * * *